UNITED STATES PATENT OFFICE.

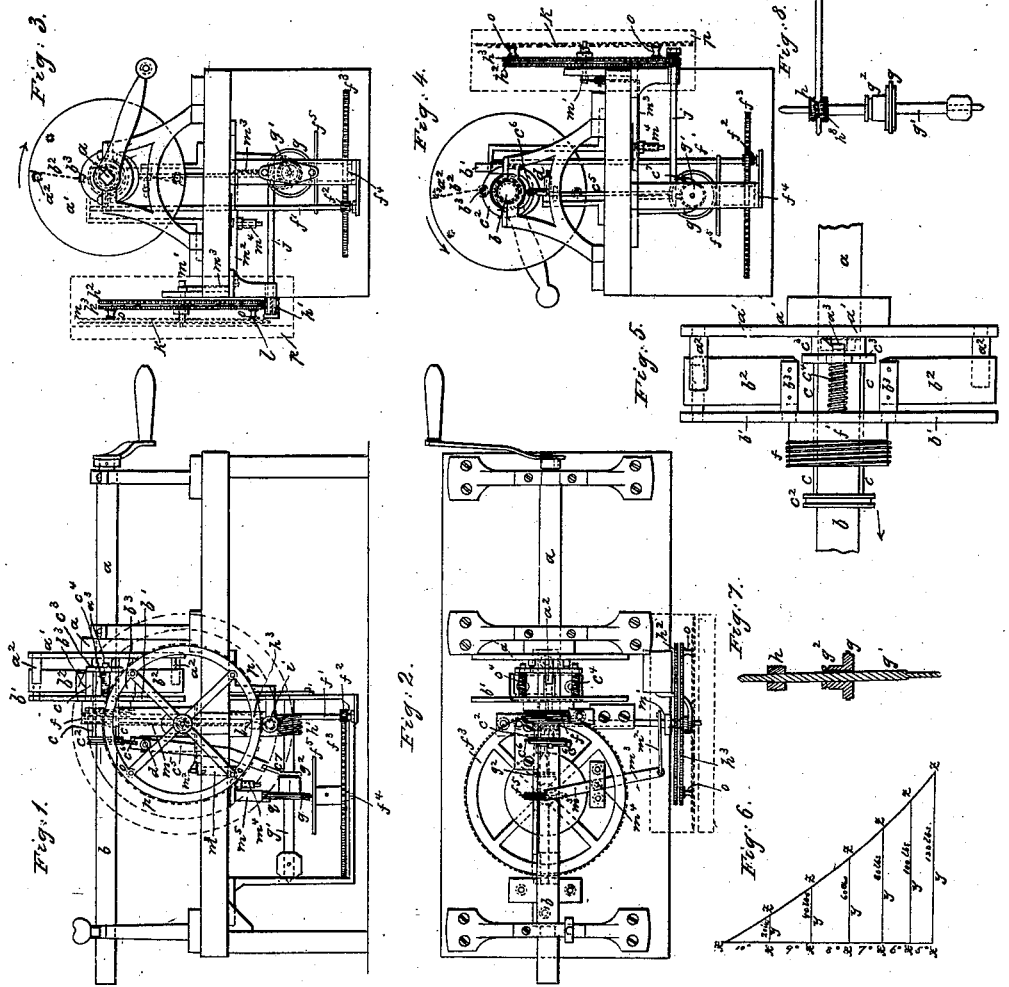

WILLIAM B. LEONARD, OF NEW YORK, N. Y.

REGISTERING-DYNAMOMETER.

Specification of Letters Patent No. 12,099, dated December 19, 1854.

*To all whom it may concern:*

Be it known that I, W. B. LEONARD, of the city, county, and State of New York, have invented certain new and useful Improvements in Machines for Ascertaining the Power Given Out or Absorbed by Machines, which I denominate a "Registering-Dynamometer," and that the following specification, taken in connection with the drawings, is a full and fair description thereof.

Figure 1 of the drawings is a front view of the apparatus in which a crank occupies the position of the crank or shaft of some prime mover or some apparatus communicating power. Fig. 2 is a top view of the apparatus. Fig. 3 is an end view from the crank end thereof. Fig. 4 is an end view from the opposite end. Fig. 5 is a view of the spring driving connection and its accessories. Fig. 6 is a development of a cam so graduated as to compensate for the unequal fluctuations of a spring when acted upon by equal increments of weight. Fig. 7 is a section through the friction wheel and its shaft, showing the feather and grooves by which the former is attached to the latter, and Fig. 8 is a top view showing the mechanism by means of which said friction wheel communicates with the register.

This instrument of mine has been devised to meet certain requirements well understood by mechanics and engineers, and is applicable to prime movers which imparts or communicates rotary motion or all machines to which rotary motion is communicated, it will also be of great use in determining the power given out by experimental motors or absorbed by experimental machines and may also be used advantageously as a test for the lubricating qualities of oils and lubricating compounds. Its chief use however will be in those establishments where power is let out or furnished to tenants, where a large dynamometer may be placed at the prime mover, and smaller ones at the various points where power is taken off, much in the same manner to use a familiar illustration as gas meters are now employed.

The machinery forming my apparatus may be divided into two great divisions, first the temporary indicating apparatus, and second the apparatus which adds up and registers these indications, and although I have called the former an indicating apparatus it is not necessary that its indications should be conveyed to the eye of an observer, all that is actually requisite being that they should be sensibly communicated to the registering apparatus.

As a matter of convenience and to satisfy curiosity I have arranged a hand which indicates to the eye of an observer the power or rather the pressure used or given off at any specified time.

The first division of the apparatus is, as shown in the drawings, similar both in construction and operation to some heretofore contrived, and consists mainly of a spring connection between a driving and a driven shaft or their equivalents said spring being either more compressed or more expanded as the power communicated increases or decreases, or vice versa, and actuating by such compression or expansion a train of mechanism by means of which a lever or its equivalent is caused to vibrate independently of the number of revolutions of the shaft or shafts. In order to ascertain the power given off by any motor to which such a dynamometer is applied it is necessary first to know the power of the spring, second its mean distance from the center of the shaft and third the velocity of the shaft. An observer must therefore watch the indicator and count the revolutions from time to time, and if the machine be working equably he can by a calculation estimate its absolute power.

The registering part of my machine is put in revolution either by the prime mover or the mechine, and may be in its nature similar to any known meter or counter, its indications however do not depend wholly upon the number of revolutions but upon that number modified and controlled in a certain varying ratio dependent upon the compression or expansion of the springs through which the power is conveyed. My contrivance as a whole therefore remedies the difficulties attending fluctuations and obviates the necessity of an attendant, and registers the actual power consumed or applied.

I will now proceed to describe the apparatus represented in the drawings, which I have found to be simple and practical, premising however that I shall denominate as the controlling connection, that train of mechanical elements consisting of a lever secondary shaft and friction wheel or their equivalent, said lever causing said friction wheel to vibrate along its shaft in distances proportional to the force communicated or absorbed at any given time, and said wheel being freed from the shocks and jars usually incident to the motion of a driving shaft, the whole being the agent whereby the registration of an ordinary counter is modified according to the force communicated or absorbed at any given time.

In the drawings, $a$, represents a shaft actuated by any prime mover, upon which is keyed or otherwise firmly attached a pulley or disk $a'$ from which project any convenient number of arms $a^2$ $a^2$, and either to the shaft or the pulley is firmly fixed a cam $a^3$. Against this shaft abuts another shaft $b$, carrying upon it a disk $b'$, also provided with arms $b^3$ $b^3$ to which are attached springs $b^2$ $b^2$ etc., these springs and both sets of arms being shown in dotted lines in Figs. 3 and 4.

The disk $b'$ has cut through it several slots, and through these slots pass rods $c$ $c$. A collar $c^2$ being fastened to one end thereof while to the other end is attached a collar $c^3$ which has in it a recess or cam shaped cavity which lies in contact with the cam $a^3$. These rods and collars all connected together are free to slide along the shaft $b$, and are held in contact with the cam $a^3$ by means of spiral springs clearly shown in the drawings at $c^4$.

Into the groove in the collar $c^2$ is fitted a yoke $c^6$ attached to a lever $c^5$ which is pivoted at $d$, and this train of movements forms the indicating apparatus. Its operation is as follows, power is communicated to the prime mover shaft, which rotates it with its disk; the shaft $b$ driving the machine or having attached to it some pulley or cog which shall serve that purpose. Now the shaft $b$ is driven by means of the arms $a^2$ pressing against the springs $b^2$. These when bent so far that their tension will overcome the friction of the machine, drag around the disk $b'$ and with it the shaft $b$, see dotted lines in Figs. 3 and 4. It is plain however that any point upon the shaft $a$, will change its angular position with regard to any point upon the shaft $b$, by just so much as the springs are bent. The cam $c^3$ will therefore change its position with respect to the cam $a^3$ and the collar $c^2$ will be moved along the shaft $b$ in the direction of the arrow.

The distance through which $c^2$ will move will depend upon the resistance offered to the rotation of the shaft $b$, and upon strength of the springs. As the resistance offered by the driven machine increases $c^2$, will move farther in the direction of the arrow; as it decreases, $c^2$ will return in the contrary direction and will thus continually fluctuate in its position along the shaft. All its fluctuations will be communicated to the lever $c^5$, and this lever if provided with an index and a dial would constitute an evanescent or temporary dynamometer, very similar to some heretofore contrived. Such an index and dial is attached and will hereafter be described. Upon either shaft is attached firmly a screw $f$, which by means of a pinion gives rotation to a shaft $f'$ provided at its other end with a pinion $f^2$. This latter pinion engages with a toothed wheel $f^3$ pivoted at $f^4$, and to the shaft of the latter is attached a table or face-friction-wheel $f^5$. The revolutions of $f^5$ bear therefore a certain proportion to the revolutions of the shaft upon which is keyed the screw $f$, and if the counter or register were driven directly therefrom it would be a mere modification of an ordinary species of counter.

The controlling connection is composed of a friction wheel $g$, mounted upon a shaft $g'$, on which it is free to slide lengthwise, it cannot however revolve without turning this shaft being coupled to it by a feather and groove or their equivalents, clearly shown in Fig. 7. To this friction wheel is attached firmly a grooved hub $g^2$, into which enters a yoke $c^7$ upon the end of the lever $c^5$. The friction wheel could be attached and moved without the intervention of lever $c^5$, but it would then be subject to all the jars of the driven shaft. The action of these parts of the apparatus is as follows: $f^5$ is driven as before stated at a velocity bearing a certain definite relation to that of the shaft, and $g$, if resting upon the center of $f^5$, would not rotate at all; if $g$ be moved in the direction of the arrow along its shaft, it will commence to rotate and the farther it is moved the faster will it revolve; when the lever $c^5$ commences to fluctuate, the wheel $g$ will through the agency of the yoke and groove fluctuate also, and if the revolutions of the main shaft $a$, be constant during each instant of time, the revolutions of $g$ will vary in relation thereto, in the ratio that the power absorbed by the driven machine increases or diminishes. If the power absorbed be constant and the velocity varies then will the revolutions of $g$ vary with the velocity of the machine. It is clear therefore that the number of revolutions made by $a$ in any period of time will if recorded, measure the power communicated from $a$, to $b$, or from the prime mover to the driven machine during that time, and this entirely independent of the fluctuations either in the force at any one instant or of the velocity during any one instant. All that is necessary to reduce this registration to any given standard is to know the power of the springs, their distance from the center of motion; the proportion that the revolutions of $f^5$, bear to the revolutions of $a$, or $b$; the lengths of the arms of lever $c^5$; and the diameter of $g$. The indications of the counter therefore depend upon the revolutions of $f^5$, as controlled by the position of $g$.

From the shaft $g'$ may be driven any ordinary species of register. The one shown in the drawings is constructed as follows: Upon the shaft $g'$, is mounted a screw $h$, which engages and drives a small pinion keyed upon a shaft, $j$. This pinion is clearly shown in the partial horizontal projection, Fig. 8. Upon the shaft $j$, is also keyed another pinion $h'$, which engages and drives two larger toothed wheels $h^2$, $h^3$, the latter of which by means of studs $o$ $o$, carries the dial $k$, while the former carries a hand or pointer $l$. The teeth in the wheel that carries the dial are one less in number than those in the wheel which carries the hand, and as both wheels are driven from the same pinion the hand gains on the dial an angular distance equal to that subtended by one cog at every complete revolution. These two wheels will therefore register any number of revolutions not greater than the number of teeth in the dial wheel. The dial wheel also revolves in proximity to a fixed dial $p$ and any portion of a revolution of it is thus registered.

Both of the cog wheels are mounted upon cannon shafts one inclosed within the other and through both passes a small spindle to which is attached a hand $m$, on the other end of this spindle is secured an arm $m'$ to which is confined by means of a bolt a small connecting rod $m^2$. The other end of this rod is secured to a lever bent twice at right angles $m^3$, which is pivoted at $m^4$, this lever is forked at $q$ and embraces there the friction wheel $g$. As $g$ vibrates along its shaft, so does $m^3$ vibrate on its pivot, and as $m^3$ vibrates so does the hand $m$ reciprocate over a dial. The hand $m$ therefore moves as the springs $b^2$ $b^2$ are bent and this hand shows the force applied to those springs at any one moment of time, it therefore in connection with its actuating mechanism constitutes the evanescent or indicating dynamometer hereinbefore referred to.

In experimenting with my machine, as first constructed I discovered that it was impossible, or nearly so, to obtain springs which should bend through equal arcs, or should be distended or compressed through equal spaces when acted upon by equal increments of weight. Such springs are essential for the correct action of the indicating dynamometer or if others are employed their variations must be compensated for by some correction within the machine. I therefore proceeded as follows, viz, I wound a strong cord around the shaft $a$, and applied to one end of it a weight, while I at the same time secured $b$ so that it would not revolve. This weight bent the springs a given amount which was registered from a measurement of the number of degrees through which a fixed point on one disk moved with reference to a fixed point on the other. The weight was then increased, and the angular distance between these fixed points again measured and recorded. The weight was then increased again by an equal addition, the angular distance measured again and so on until the safe limit of the pressure on the springs was reached. I then constructed on paper a series of abscissæ and ordinates as in Fig. 6 laying off on the line $x$, $x$, the number of degrees and on the lines $y$, $y$, the number of pounds in weight corresponding therewith, and drew the curve through the points $z$ $z$—the cam shaped recess in the collar $e^3$ was made after this curve as its development and it is clear corrects any inequalities in the spring.

If I wish by means of this apparatus to test the power of a prime mover, I apply a brake or some retarder to the shaft $b$, and I apply the prime mover to the shaft $a$. If it is desired to know the power absorbed by any machine or train of machines I apply some shaft actuated by a prime mover to $a$, and from $b$, I take off the motion to shafting driving the machine or train. In shops where power is let out I apply one large dynamometer between the engine and the primary line of shafting, and I apply other dynamometers at each point where power is taken off from the primary line. The large dynamometer will then indicate a power equal to the sum of those indicated by the smaller ones if there be added to the latter the friction of the line of the shafting between the large and the small dynamometers.

When used for an oil test any machine may be lubricated with some one oil and driven for a certain length of time through one of the dynamometers, whose registrations are then recorded. The journals, etc., are then carefully wiped and some other lubricator applied and the registrations of the dynamometer again recorded. The difference between these two registrations will indicate the relative values of the lubricators.

It will be evident I think to any competent mechanic that the apparatus herein described may be much varied in form and arrangement and by the substitution of equivalents without in any degree changing its nature and also that such alterations will still be within the scope of my invention. To commence with minor changes, it is clear that springs of any kind may be employed in place of those that I have represented that any known methods of communicating rotary or reciprocating motion may be employed in place of those herein described, and that all known methods of changing the relative velocity between a driving and a driven wheel may be substituted in place of the two right angled friction wheels employed by me. It is obvious further that any known kind of counter or register of revolutions may be substituted as a whole in place of that herein described, and while stating these points upon which changes might be made which would be mere changes, not modifying the character of my invention, I wish clearly to be understood on the other hand as not claiming by themselves any of the mechanical movements separately, as they are common property, neither do I claim them in limited combination, for instance the indicating dynamometer as a combined machine is not new with me, neither is the counter in so far as it is composed of two cog wheels of different numbers of teeth actuated by the same pinion, neither are the two friction wheels one of which is caused to traverse across the disk of the other.

Further having thus described my apparatus and some of the modifications of which it is susceptible, I would state that I am aware that in a French machine devised for registering the power necessary to draw wagons for a given length of time over a given length of road, the force necessary for draft has been multiplied by the velocity of the vehicle by means of a revolving disk and an oscillating friction wheel such as is herein described. I do not therefore claim in the broad multiplying force by velocity by mechanical means, but I do claim as of my own invention—

The registering dynamometer for rotary motion which is made up by the combination of an indicating dynamometer for rotary motion, with a registering apparatus by means of a controlling connection constructed and arranged substantially in the manner herein defined and described.

W. B. LEONARD.

Witnesses:
 C. E. LEONARD,
 D. C. AMBLER.